United States Patent [19]
Gross et al.

[11] Patent Number: 5,505,145
[45] Date of Patent: Apr. 9, 1996

[54] PROCESS AND APPARATUS FOR WASTE INCINERATION

[75] Inventors: Gerhard Gross, Willich; Frank Lichtmann, Gummersbach, both of Germany

[73] Assignee: Messer Griesheim GmbH, Germany

[21] Appl. No.: 427,750

[22] Filed: Apr. 24, 1995

[30] Foreign Application Priority Data

May 2, 1994 [DE] Germany ................. 44 15 342.2

[51] Int. Cl.$^6$ ................. F23G 5/02; F23G 5/14; F23G 5/24; F23L 7/00
[52] U.S. Cl. ................. 110/248; 110/256; 110/259; 110/346; 110/210; 110/216
[58] Field of Search ................. 110/210, 215, 110/216, 244, 248, 256, 259, 288, 289, 346, 165 R, 165 A, 251

[56] References Cited

U.S. PATENT DOCUMENTS

| | | | |
|---|---|---|---|
| 4,191,114 | 3/1980 | Saitoh et al. | 110/248 |
| 4,732,091 | 10/1988 | Gould | 110/256 |
| 4,871,147 | 10/1989 | Muschelknautz et al. | 110/244 |
| 5,179,902 | 1/1993 | Vojtech | 110/248 |
| 5,237,940 | 8/1993 | Pieper et al. | 110/346 |
| 5,245,113 | 9/1993 | Schulz | 110/346 |
| 5,279,234 | 1/1994 | Bender et al. | 110/346 |
| 5,311,830 | 5/1994 | Kiss | 110/346 |

Primary Examiner—Willis R. Wolfe
Attorney, Agent, or Firm—Connolly & Hutz

[57] ABSTRACT

Figure 1:
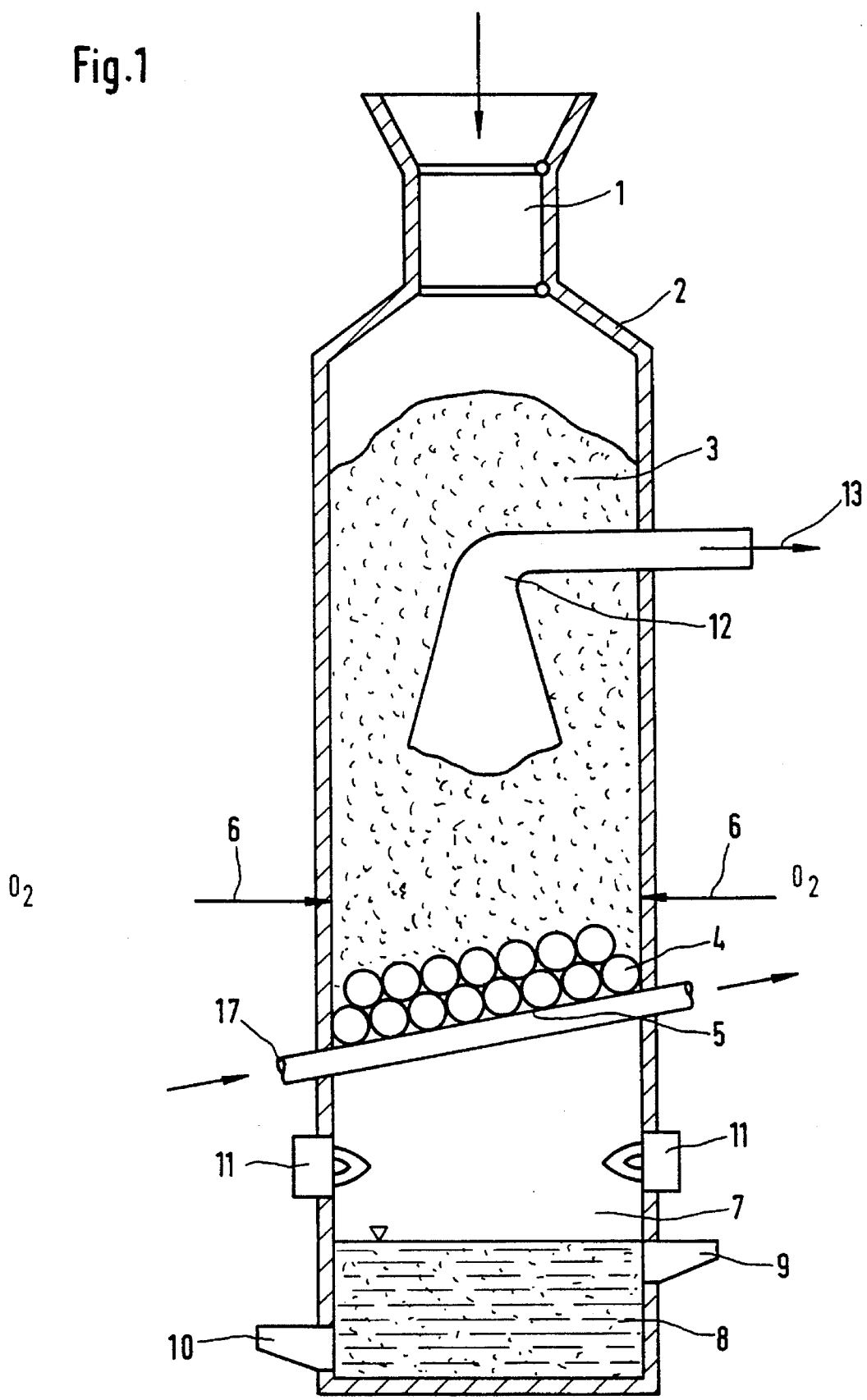

The invention relates to a process for burning waste with simultaneous regeneration of a usable gas and an inert solid residue in which the waste is fed into the upper part of an upright shaft furnace, an oxygen-containing gas is fed into the lower part of the furnace, the organic part of the waste substances is gasified and pyrolyzed, the inorganic part of the waste substances is made flowable, the gas from the upper part of the furnace is taken off and the inorganic material made flowable is taken off at the lower part of the furnace. In order to achieve secondary treatment of the solid and gaseous combustion residues without high expenditure in terms of apparatus, according to the invention the waste is loaded as a charge (3) on a grate (5) provided in the shaft furnace (2), a fuel-oxygen mixture or a fuel-oxygen-air mixture is used as oxygen-containing gas and is introduced into the shaft furnace (2) and oxidized beneath the grate (5), above the grate (5) pure or technical-grade oxygen or air enriched with pure or technical-grade oxygen is injected into the waste charge (3) as oxidizing medium and the waste (3) if appropriate together with combustion residues is burned preferably at temperatures of 1400 to 1600° C. (FIG. 1).

14 Claims, 2 Drawing Sheets

PROCESS AND APPARATUS FOR WASTE INCINERATION

The invention relates to a process and an apparatus for waste incineration in accordance with the preamble of claim 1.

In the disposal of wastes in domestic refuse incineration plants, ashes, slags and filter dusts arise which, because of the conventionally prevailing incineration temperatures of 850° to 1050° C. are only present in crystalline or partially sintered form. These incineration residues contain heavy metals, salts and organic pollutants so that landfilling is virtually the only option for disposal. Rust ashes and slags can best be used as low-grade building materials, there being, however, the risk of long-term uncontrolled release of the above-mentioned pollutants. Boiler ashes and fly dusts must be stored in special waste landfills if no complex post-treatment is carried out. The increasing scarcity of landfill sites, increasing strictness of the legal regulations on avoidance and utilization of wastes and the existing problems concerning acceptance of domestic refuse incineration plants require considerable improvement of the thermal combustion processes with respect to process simplification and improvement of the chemical and physical properties of the residues remaining there.

A multiplicity of thermal disposal processes, such as incineration, gasification and pyrolysis or combinations thereof have already been developed in the past. The processes previously established, such as incineration in a shaft furnace, only solve the described objective incompletely since high additional expense is required for post-treatment of the residues. Newer processes, which make use of e.g. a pyrolysis and downstream high-temperature combustion or gasification (low-temperature pyrolysis—combustion or Thermoselect process), claim to operate virtually free from residues which can be utilized only with difficulty, but only achieve this goal by using a significantly more complex processing method and/or a processing method which can be mastered only with difficulty.

The object therefore underlying the invention is to provide a fossil-fueled process and an apparatus for melting waste by which a post-treatment of the solid and gaseous combustion residues can be achieved without high expenditure in terms of apparatus. Starting from the prior art described in the preamble of claim 1, this object is achieved by the features specified in the characterizing part of claim 1.

Advantageous further developments of the invention are specified in the subclaims.

The invention advantageously effects a separation between the shaft furnace charge and the mineral melt in order to guarantee the chemical and physical properties of the mineral melt and of the eluate values.

The separation of the waste from the melt situated in the lower furnace is achieved by a water-cooled grate situated in the shaft furnace, on which grate the waste charge rests.

Figure 2:
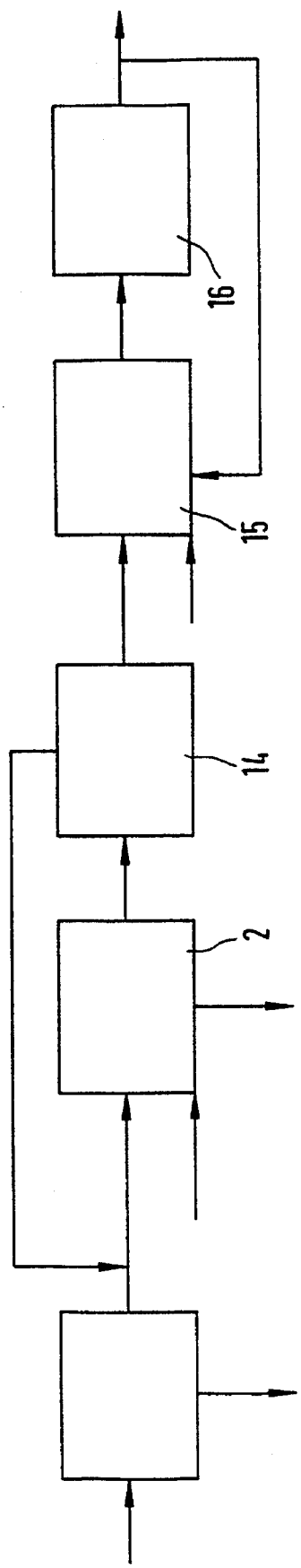
Figure 2:
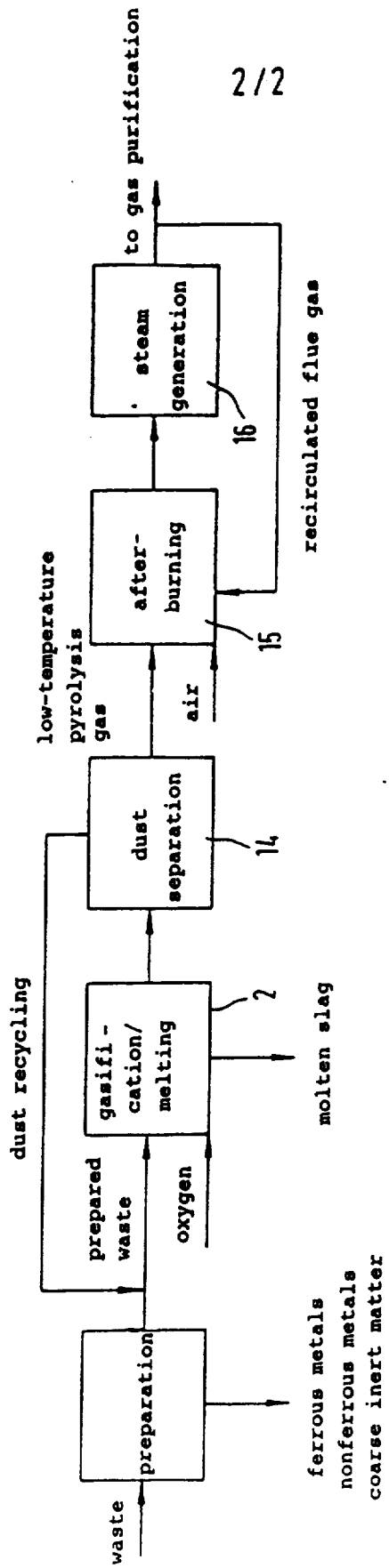

An illustrative example of the invention is shown in the drawing and is described in more detail below. In the figures FIG. 1 shows a shaft furnace according to the invention for melting waste having a fuel/oxygen-air burner and $O_2$-injection lances;

FIG. 2 shows a process diagram for post-treatment of the gases and flue gases.

The wastes which have been freed in advance from ferrous metals and nonferrous metals and coarse inert matter—coarse non-inert fractions are coarsely crushed—are added from the top to the upright shaft furnace 2 via a suitable apparatus 1. The feed apparatus is intended to be suitable for keeping as low as possible the entry of secondary air into the system operated at reduced pressure. The waste is then situated as a charge 3 in the furnace in which it moves downward in accordance with the consumption of the charge in the lower region. The waste charge rests on a bed of spheres 4 made of suitable refractory ceramic material and the spheres themselves rest on a grate 5 made of parallel, water-cooled tubes 17 arranged at an angle of approximately 5° to the horizontal. The oxidizing medium—pure or technical-grade oxygen or air enriched with pure or technical-grade oxygen having an oxygen content of 30% by volume $<O_2>$ 100% by volume—is injected via injection lances 6 above the bed of the spheres 4 into the waste charge 3 at high velocity which can be either above the speed of sound or the speed of sound. The oxygen is preferably generated in a cryogenic or oxygen-on-site plant at a purity of 80 to 100%. Under the action of the oxidizing medium the waste burns at a temperature high enough for the non-flammable portions in the waste to melt, preferably at temperatures between 1400° and 1600° C. These molten residues flow off downward through the sphere bed 4 and the grate 5 and collect in the lower furnace 7 forming a mineral melt 8 which flows off via the upper channel 9 and is fed to further processing steps. By means of the grate 5, an advantageous spatial separation between the melt 8 collecting in the lower furnace 7 and the waste charge 3 is achieved. As a result of the throughflow of cooling water, a slag coat forms on the tubes 17 of the grate 5, which slag coat protects the tubes 17 from excessive thermal and chemical stress.

Residual metallic non-flammable portions which are likewise melted and collected in the lower furnace 7 separate from the mineral melt as a result of the density difference and can be taken off as required through the lower channel 10. In the lower furnace 7 burners 11 are further arranged which serve for heating the furnace on start-up and, if required, for temperature elevation in the lower furnace 7.

The lower part of the shaft furnace is advantageously made to be exchangeable in order to make possible inexpensive repairs particularly on the zones of the refractory lining of the shaft furnace 2 coming into contact with melt. The interface with the upper part of the shaft furnace 2 can be situated either below or above the water-cooled grate 5. The erosion occurring on the spheres made of refractory ceramic material is advantageously replaced by addition of new spheres 4 to the wastes charged.

The low-oxygen and $CO_2$— and $H_2O$-rich gases formed in the combustion and melting of the wastes enter at high temperature from below into the still unburned part of the charge and there lead to a gasification of some of the flammable constituents of the wastes in accordance with the Boudouard equilibrium and the heterogeneous water-gas equilibrium. As a result of the endothermic reactions and the heating of the wastes occurring in the course of this, the gases cool. On flowing through the cooler parts of the charge 3 situated above, the gasification reactions cease and only the more readily volatile waste constituents are released and pyrolyzed. Further above there is a zone in which the wastes are only dried. In this region is arranged a suitable extraction apparatus 12 via which the resulting gases, termed low-temperature pyrolysis gases 13 below, can be taken off as a result of the reduced pressure present.

In accordance with the process diagram shown in FIG. 2, the low-temperature pyrolysis gases at approximately 200° C. are fed to the afterburning which can be carried out with air as oxidizing medium. Because of the sufficiently high heating value of the gases generated, temperatures of 850° C., as in domestic refuse incineration, up to approximately 1200°–1300° C. as in special waste incineration can be established in the after-burning. All oxidizable substances are burned in the afterburning chamber; the residence time required can be established by the combustion chamber dimensioning. To restrict the air excess and for advantageous reduction of the amounts of flue gas and improvement of the thermal efficiency, there is the possibility of replacing some of the combustion air required by recirculated flue gas.

As an advantageous further development of the process, the gas generated can be subjected to dust separation 14 even before afterburning. The dusts separated off there, as with all or some of the dusts separated off in the gas and flue gas paths in the case of afterburning without prior dust separation, can be advantageously added back to the prepared waste, possibly after solidification by addition of an inorganic binder. Dedusting at this point has the advantage that the following flue gas paths, especially the afterburning chamber 15 and the heating surfaces of the steam generator 16, are protected as far as possible from fouling.

As a further advantageous development of the process, afterburning, e.g. in the case without prior dedusting, can be operated at temperatures of preferably 1300° to 1400° C. which are sufficiently high that the dusts contained in the flue gas melt and are taken off in liquid form from the lower part of the afterburning chamber. The hot flue gases from the afterburning are fed to a steam generator having radiative and convective heating surfaces in order to use the thermal energy inherent in the flue gases. Downstream of the steam generator or downstream of a downstream deduster the flue gas quantity necessary for recirculation is taken off from the flue gas stream. The flue gas quantity which is advantageously low, in this manner is then fed to a gas purification process, e.g. comprising very fine dust separation, scrubbing and secondary purification.

What is claimed is:

1. A process for burning waste with simultaneous regeneration of a usable gas and an inert mineral residue in which the waste is fed into the upper part of an upright shaft furnace, an oxygen-containing gas is fed into the lower part of the furnace, the organic part of the waste substances is gasified and pyrolyzed, the inorganic part of the waste substances is made flowable, the gas from the upper part of the furnace is taken off and the inorganic material made flowable is taken off at the lower part of the furnace, which comprises the waste being loaded as a charge on a grate provided in the shaft furnace, a fuel-oxygen or a fuel-oxygen-air mixture being introduced into the shaft furnace beneath the grate and oxidized, pure or technical-grade oxygen or air enriched with pure or technical-grade oxygen being injected above the grate into the waste charge as oxidizing medium and the waste if appropriate together with combustion residues being burned preferably at temperatures of 1400° to 1600° C.

2. The process as claimed in claim 1, wherein the grate is water-cooled and at least one layer of spheres composed of a refractory material is arranged on the grate.

3. The process as claimed in claim 2, wherein the oxygen content of the oxidizing medium is 30% by volume $<O_2<100\%$ by volume.

4. The process as claimed in claim 3, wherein a cryogenic or oxygen-on-site plant is used to generate the oxygen having a purity of 80 to 100% by volume.

5. The process as claimed in claim 4, wherein at least some of the dusts separated off in the gas and flue gas paths are added to the waste.

6. The process as claimed in claim 5, wherein the gas generated is passed into an after-burning chamber and burned with feed of air.

7. The process as claimed in claim 6, wherein the flue gas is fed to a steam generator having radiative and/or convection surfaces.

8. The process as claimed in claim 1, wherein the oxygen content of the oxidizing medium is 30% by volume $<O_2<100\%$ by volume.

9. The process as claimed in claim 1, wherein a cryogenic or oxygen-on-site plant is used to generate the oxygen having a purity of 80 to 100% by volume.

10. The process as claimed in claim 1, wherein at least some of the dusts separated off in the gas and flue gas paths are added to the waste.

11. The process as claimed in claim 1, wherein the gas generated is passed into an after-burning chamber and burned with feed of air.

12. The process as claimed in claim 11, wherein the flue gas is fed to a steam generator having radiative and/or convection surfaces.

13. An apparatus for burning waste with simultaneous regeneration of a usable gas and an inert mineral residue in which wastes are fed into the upper part of an upright shaft furnace, an oxygen-containing gas is fed into the lower part of the furnace, the organic part of the waste substances is gasified and pyrolyzed, the inorganic part of the waste substances is made flowable, the gas from the upper part of the furnace is taken off and the inorganic material made flowable is taken off at the lower part of the furnace, which comprises a grate being arranged between the upper and lower part of the shaft furnace, at least one burner being arranged beneath the grate, the burner being connected to a fuel/oxygen or fuel/oxygen-air supply, at least one injection lance being arranged above the grate, the injection lance being connected to an oxygen supply or oxygen-air supply, the oxygen or the oxygen-air mixture being blown in at velocities equal to or above the speed of sound of the oxidizing medium.

14. The apparatus as claimed in claim 13, wherein the grate is composed of water-cooled tubes and one or more layers of spheres made of a refractory material are arranged on the grate.

* * * * *

UNITED STATES PATENT AND TRADEMARK OFFICE
CERTIFICATE OF CORRECTION

PATENT NO.    : 5,505,145  
DATED         : April 9, 1996  
INVENTOR(S)   : Gerhard Gross, et al.

It is certified that error appears in the above-identified patent and that said Letters Patent is hereby corrected as shown below:

Figure 2 should include the legends as on the attached copy of Figure 2.

Signed and Sealed this

Eighteenth Day of March, 1997

*Attest:*

BRUCE LEHMAN

*Attesting Officer*     Commissioner of Patents and Trademarks